June 30, 1959   E. B. GARDNER ET AL   2,892,733
METHOD AND APPARATUS FOR TREATING SYNTHETIC RESIN CONTAINERS
Filed Sept. 16, 1955   5 Sheets-Sheet 4
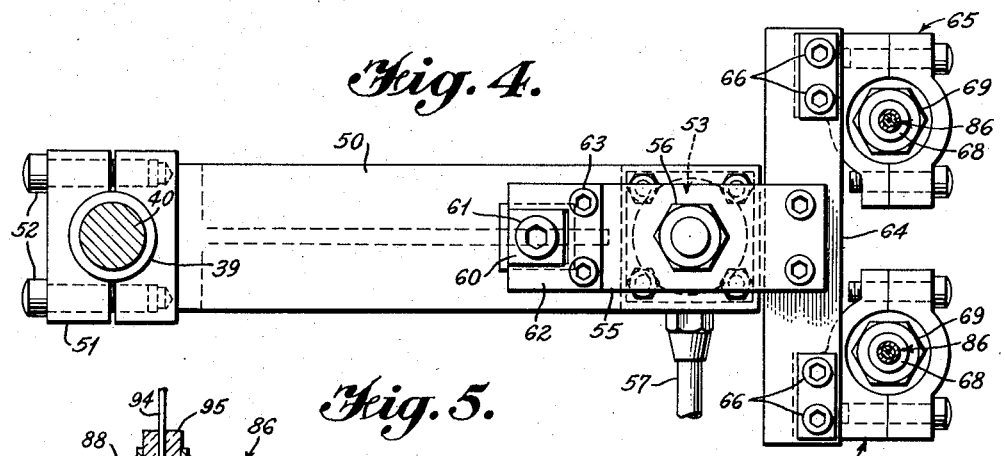
Fig. 4.
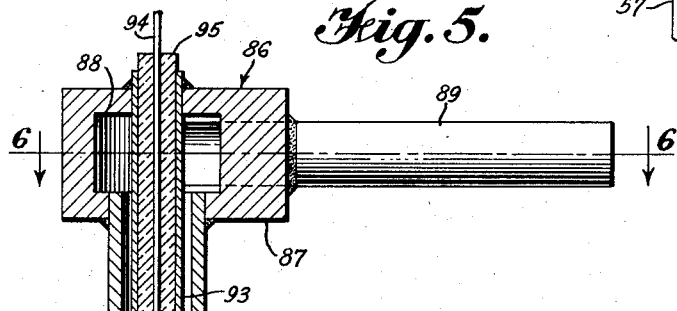
Fig. 5.
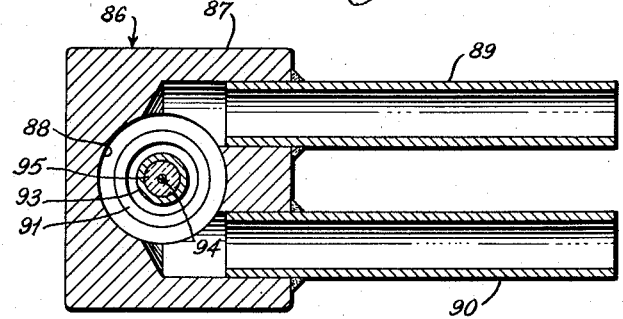
Fig. 6.
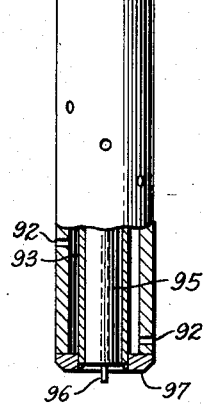
INVENTORS
Edward B. Gardner
and Alvin R. Nielsen
BY Burns, Doane, Benedict & Crone
ATTORNEYS June 30, 1959  E. B. GARDNER ET AL  2,892,733
METHOD AND APPARATUS FOR TREATING SYNTHETIC RESIN CONTAINERS
Filed Sept. 16, 1955  5 Sheets-Sheet 5

INVENTORS
Edward B. Gardner
and Alvin R. Nielsen

BY
ATTORNEYS 2,892,733

**METHOD AND APPARATUS FOR TREATING
           SYNTHETIC RESIN CONTAINERS**

Edward B. Gardner, Bloomfield, and Alvin R. Nielsen,
 Hartford, Conn., assignors to Plax Corporation, Bloomfield, Conn., a corporation of Delaware Application September 16, 1955, Serial No. 534,811

45 Claims. (Cl. 117—46)

This invention relates generally to a method and apparatus for treating the interior walls of synthetic resin containers. More specifically, the invention is directed to a method and apparatus for modifying the interior walls of synthetic resin containers, such as polyethylene bottles, to provide a surface receptive to a coating applied thereto. The invention further embraces a method and apparatus for applying a coating normally of a polar synthetic resin to the so modified container walls.

Synthetic resin containers and bottles, as for example polyethylene bottles, have within the last few years been widely used in the packaging of various liquids, such as deodorants, hair preparations, cosmetic preparations, etc. Polyethylene has been, and is widely used in the production of squeeze bottles for the distribution of these liquid preparations in that it is relatively inert, has the desirable flexible properties necessary to function as a squeeze bottle, can be easily fabricated and is producible in quantity at a reasonable cost. Polyethylene is entirely satisfactory as a container for a wide variety of liquids. However, polyethylene is permeable to many organic liquids, including a large number of conventional organic solvents. Representative chemicals which permeate rapidly through polyethylene at room temperature include the straight chain hydrocarbons, the aromatic hydrocarbons, esters, ketones and various non-polar fluids. The high permeability characteristic of polyethylene to such liquids has naturally restricted the usage of polyethylene bottles to those products to which polyethylene is substantially impermeable. The permeable characteristic of polyethylene with respect to certain chemicals has resulted in polyethylene bottles being rejected for use in industries where, due to its flexibility and ease of fabrication, it might otherwise be employed to advantage.

A proposal to line the polyethylene container to substantially diminish permeation encounters the problem of securing an effective bond of the lining to the container walls. The difficulty of securing adherence of other materials to polyethylene has made it extremely difficult to obtain a lasting coating of film-forming materials, other than polyethylene, on articles made of polyethylene or to effect a satisfactory bonding with the surface of an article made of a material other than polyethylene. This difficulty holds true whether the element to be applied to the polyethylene is to be built up as a coating by deposition from a solution, from a molten or liquid condition, or where both the polyethylene and the lining are preformed and it is required to bond them together.

It may be noted that where the problem is to merely prevent moisture from getting into the product or to prevent gases from the atmosphere from contacting the contents within the container, an external impermeable coating might be satisfactory. However, from the standpoint of the permeation of the liquid within the container outwardly through the container walls, as in the case of a polyethylene bottle, whereas an external impermeable coating might effectively reduce the overall weight loss, the permeation of the contents into the polyethylene bottle wall up to the exterior coating might result in considerable swelling of the polyethylene and a distortion of the bottle shape and strength. Further, with an external coating, in those mixtures where a particular ingredient might be quantitatively small but essential, such ingredient may be lost by absorption of the polyethylene, thereby destroying the desired characteristics of the mixture. This latter situation is especially true for skin lotions, perfumes, etc. in which the oil fraction that governs the perfume odor is small and such fraction would be absorbed in the polyethylene. Accordingly, despite the proportionately greater difficulty of applying an impermeable lining on the bottle interior, the advantages of such an interior lining are great in comparison with an exterior coating which may be more simply applied.

Acknowledging the above set forth problems relating to the production of relatively flexible synthetic resin containers and bottles which are permeable to certain chemicals, it is a primary object of this invention to provide a method of producing a coating adherent surface on the interior of synthetic resin containers.

It is yet another primary object of the invention to provide a method for applying an adherent coating to the interior surface of a container fabricated from a normally hydrophobic synthetic resin.

It is also a primary object of this invention to provide a method of producing a coating adherent surface on the interior of synthetic resin containers and for applying a coating of a polar, film forming material to such surface to render such container substantially impermeable to chemicals which without such coating would rapidly permeate the container walls.

It is a more specific object of the invention to provide a method for applying to the interior of a polyethylene bottle an adherent synthetic resin coating substantially impermeable to a material capable of substantially penetrating the polyethylene bottle walls in the absence of such coating.

It is a further specific object of the invention to provide a method for treating the interior surface of a polyethylene bottle to render said surface receptive to polar coating compositions, and particularly polar film forming materials.

It is an additional specific object of the invention to provide a method for sequentially oxidizing the interior surface of a polyethylene bottle and applying to any such oxidized surface a coating composition including a polar film forming resinous material impermeable to liquids capable of substantial penetration of the walls of such bottles in the absence of such coating.

It is further a principal object of this invention to provide an apparatus for successively oxidizing the interior surface of a synthetic resin container and applying an adherent coating to such oxidized surfaces.

It is a further object of this invention to provide an apparatus for introducing an explosive mixture into a synthetic resin container which is to be internally coated and igniting such mixture to produce an oxidized, coating adherent, surface on the container interior.

It is also an object of this invention to provide an apparatus for oxidizing the interior walls of synthetic resin containers, such as polyethylene bottles, wherein means are provided for introducing a predetermined amount of an explosive mixture into the container and thereafter igniting and exploding the mixture to oxidize the surface, preparatory to application of a coating to the container interior.

It is an additional object of this invention to provide an apparatus for oxidizing the interior walls of polyethylene bottles including means for introducing a mixture of a combustible gas such as propane and combustion supporting oxygen into the bottle, means for igniting the mixture to explode the mixture and thereby oxidize the bottle interior surfaces, means for applying a coating material to the oxidized surface and means for curing the coating applied to the bottle interior.

Generally, the instant invention embraces the steps of introducing an explosive mixture into the container to be lined, exploding the mixture within the container to form a coating adherent surface on the container interior, and thereafter applying coating material to such coating adherent surface. In a preferred embodiment of the invention, the coating is dried or cured at an elevated temperature to form the coating into a generally continuous lining on the interior of the container.

The apparatus of the instant invention comprises a conveyor provided with spaced supports for the container to be coated and serving to transport the containers to be coated through a succession of treatment stations, means for introducing an explosive mixture into the containers individually as they pass through the first treatment station, ignition means at such treatment station for exploding the mixture within each container to oxidize the surface of the interior walls thereof, spray means mounted at the second treatment station to coat the oxidized interior surfaces of the containers individually as they pass through the second treatment station, and means constituting a third treatment station mounted adjacent said conveyor for drying and curing the coating after the containers pass from the second treatment station.

The above and other more specific objects of the instant invention will be apparent from the description given hereinafter of a specific structure embodying the features of the instant invention and susceptible of operation in accordance with the method of this invention. It will be recognized that the structure as illustrated on the drawings is given merely by way of example to constitute a disclosure of a machine for carrying out the objects of the instant invention.

In the drawings:

Figure 4 is a horizontal sectional view taken on line 4—4 of Figure 3;

Figure 5 is a side elevational view, partly in section, of the nozzle and igniter assembly for the first treatment station;

Figure 6 is a horizontal sectional view taken on line 6—6 of Figure 5;

Figure 1:
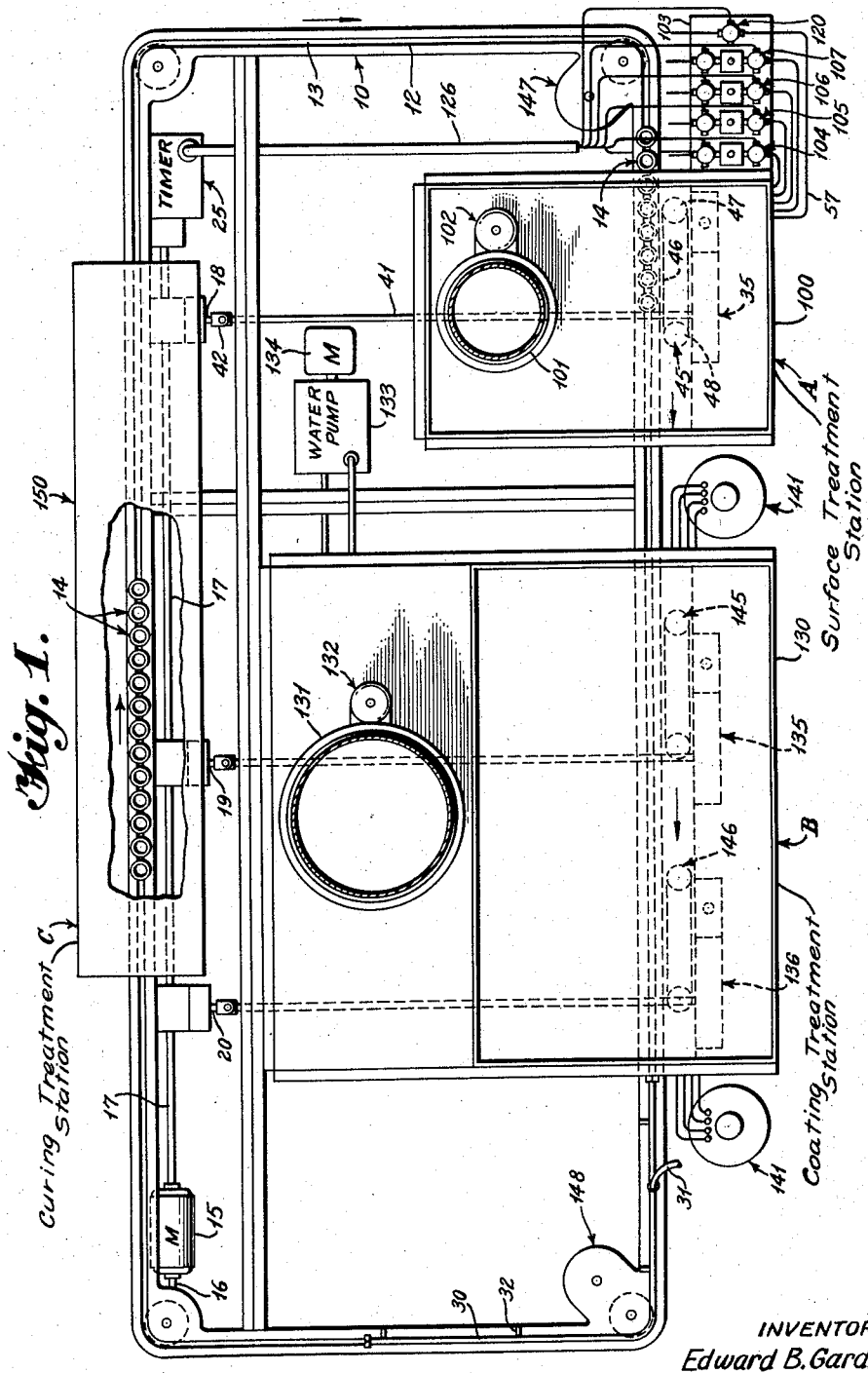
Figure 1 is a plan view illustrating the general relationship of the parts of the container lining apparatus.
Figure 2:
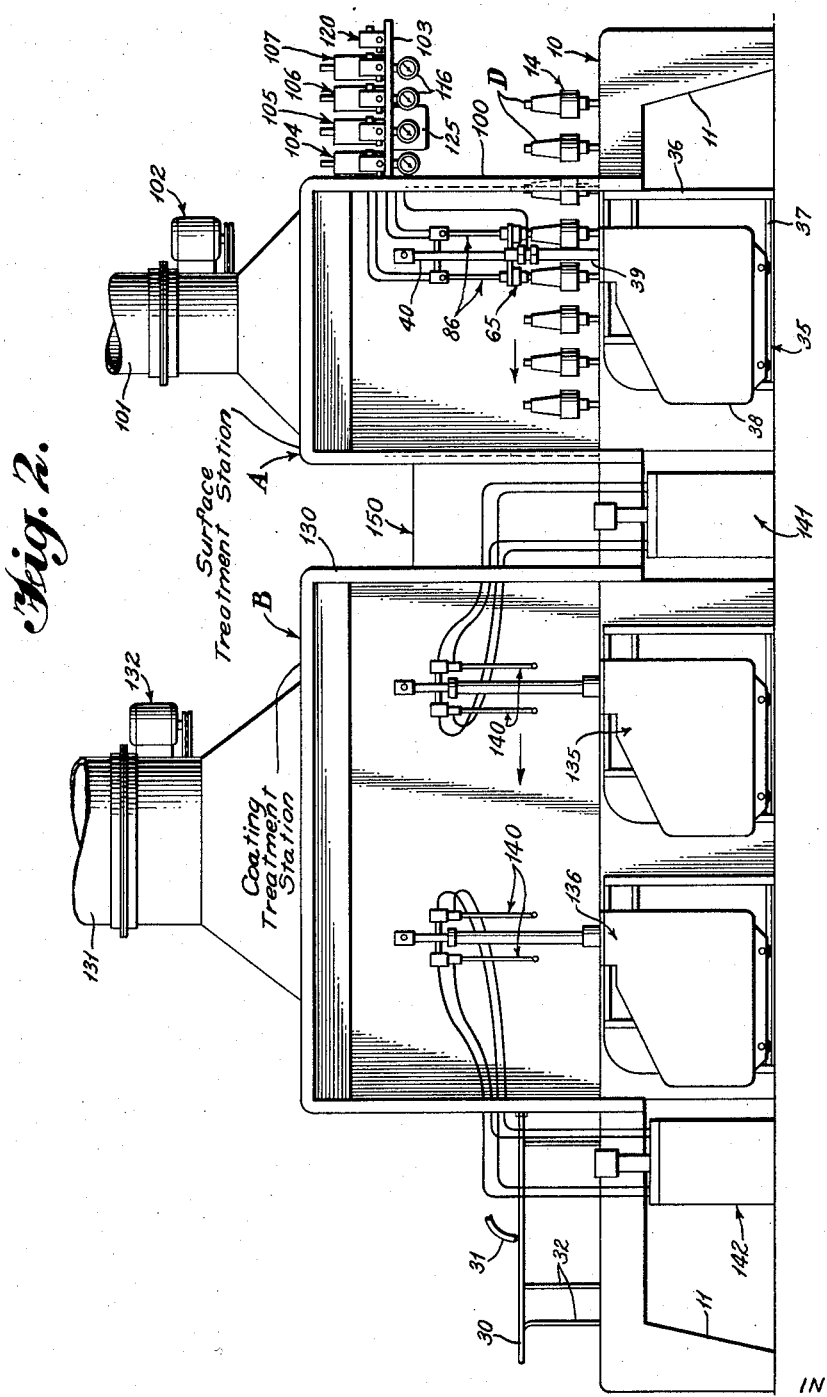
Figure 2 is a front elevational view of the structure shown in Figure 1.

Referring more particularly to Figures 1 and 2 of the drawings, there is shown thereon, somewhat diagrammatically, a continuous conveyor system including a rectangular frame 10 mounted on suitable legs 11. Frame 10 has an upwardly opening slot 12 in which is mounted an endless conveyor chain 13. This chain is constructed to carry a plurality of upwardly extending container supports 14, which are disposed at regularly spaced intervals along the length of the chain 13 and serve to transport the containers to be lined by the apparatus successively through a plurality of treatment stations or chambers. In loading and unloading the container supports 14 the operator will be positioned adjacent the right end of frame 10, as shown in Figures 1 and 2, and place the containers to be lined on the supports 14 as they are moved along by chain 13. Similarly, the containers, subsequent to their being lined, will be removed from the supports 14 as they approach the loading station.

The chain 13 is driven by a suitable electric motor 15 through a shaft 16 which is suitably coupled to drive the chain 13 carried in the slot 12 of frame 10. The motor 15 also drives through shaft 17 a series of device actuating shafts 18, 19 and 20 which are operable, as will be described hereinafter, to actuate certain devices positioned at the treatment stations located along the path of movement of chain 13. Shaft 17 further extends across to drive a timer 25 which, as will be described, is employed to synchronize actuation of devices at the first treatment station in accordance with the speed of movement of the containers to be treated through such station.

The principal treatment stations disposed along the path of movement of chain 13 include a surface oxidizing station A for treating the interior walls of the containers to be coated to make them receptive to the coating material to be applied thereto, a spray coating station B wherein the particular coating material is sprayed onto the interior of the containers which have been treated at station A and a curing and/or drying station C wherein the containers are subjected to an elevated temperature to drive off the volatile constituents of the coating material and/or cure the coating to form a lining on the bottle interior. Intermediate the outlet of station B and inlet of station C there is positioned a perforated conduit 30 connected by means of a pipe 31 to a suitable source of air pressure (not shown). Conduit 30 is mounted on supports 32 directly above the path of movement of chain 13 with the perforations of such conduit facing downwardly to direct streams of air down into the containers as they move from the coating station B. This blast of air serves as a preliminary means of driving off volatile constituents of the coating material prior to the introduction of the coated containers into the final drying and curing oven positioned at treatment station C.

Reference will now be had to the construction and function of the surface oxidizing treatment station A. At this station there is mounted a unit 35 which functions to impart appropriate reciprocating and lateral movement to the devices which cooperate with the containers to be treated as they move through the station. In other words as the continuously driven chain 13 carries the container supports 14 through the station, the devices for introducing an explosive mixture and igniting such mixture within the containers will partake of a movement corresponding to the speed of movement of the containers through the station and be moved into and out of cooperation with the containers as the machine operates.

Unit 35 includes a housing 36 mounted on frame 10 and providing a track 37. A carriage 38 engages track 37 so as to be laterally movable in a path generally parallel to the path of movement of the container supports 14 through station A. The carriage 38 is caused to move along with the progress of movement of container supports 14 by detents (not shown) engaging the base of the container supports to carry the carriage along its track 37 and be disengaged from the container supports upon reaching the end of its path of movement. A suitable carriage return mechanism (not shown) is provided to return the carriage and position the detents for engagement with the next succeeding container support to move through the treatment station. To move the container treating devices into and out of engagement with the containers being treated as they move through the station, carriage 38 is provided with an upwardly extending column 39 which guides vertical reciprocating movement of a support rod 40. Rod 40 is reciprocated by suitable linkage (not shown) which is rotated in accordance with the speed of operation of the apparatus by means of a shaft 41 connected by a universal joint 42 to the device actuating shaft 18 which, as has been described, is driven by shaft 17 from motor 15.

The specific details of construction and operation of carriage 38 in imparting reciprocating and lateral movement to support rod 40 have not been shown on the drawing since such features form no part of the instant invention and are already known in the art. By way of illustration, Paasche Patent 2,547,884, issued April 3, 1951, discloses a suitable structure which may be used to impart reciprocating and lateral movement to devices which are to cooperate with the containers as they are continuously moved through a treatment station.

As shown diagrammatically on Figure 1 a device 45 for rotating the container supports 14 is mounted behind unit 35. This device includes an endless belt 46 which is driven by pulleys 47 and 48 with one run of the belt positioned to engage with pulleys 49 (see Figure 3) mounted at the lower end of container supports 14. Belt 46 serves to impart rotation to the container supports 14 as they move through treatment station A and therefore promote the oxidation or other modification of the interior walls of the container as will be explained in more detail hereinafter. As in the case of unit 35 the specific details of device 45 have not been shown on the drawings. For a description and illustration of such specific details, reference may be had to the hereinabove mentioned Paasche Patent 2,547,884.

Figure 3:
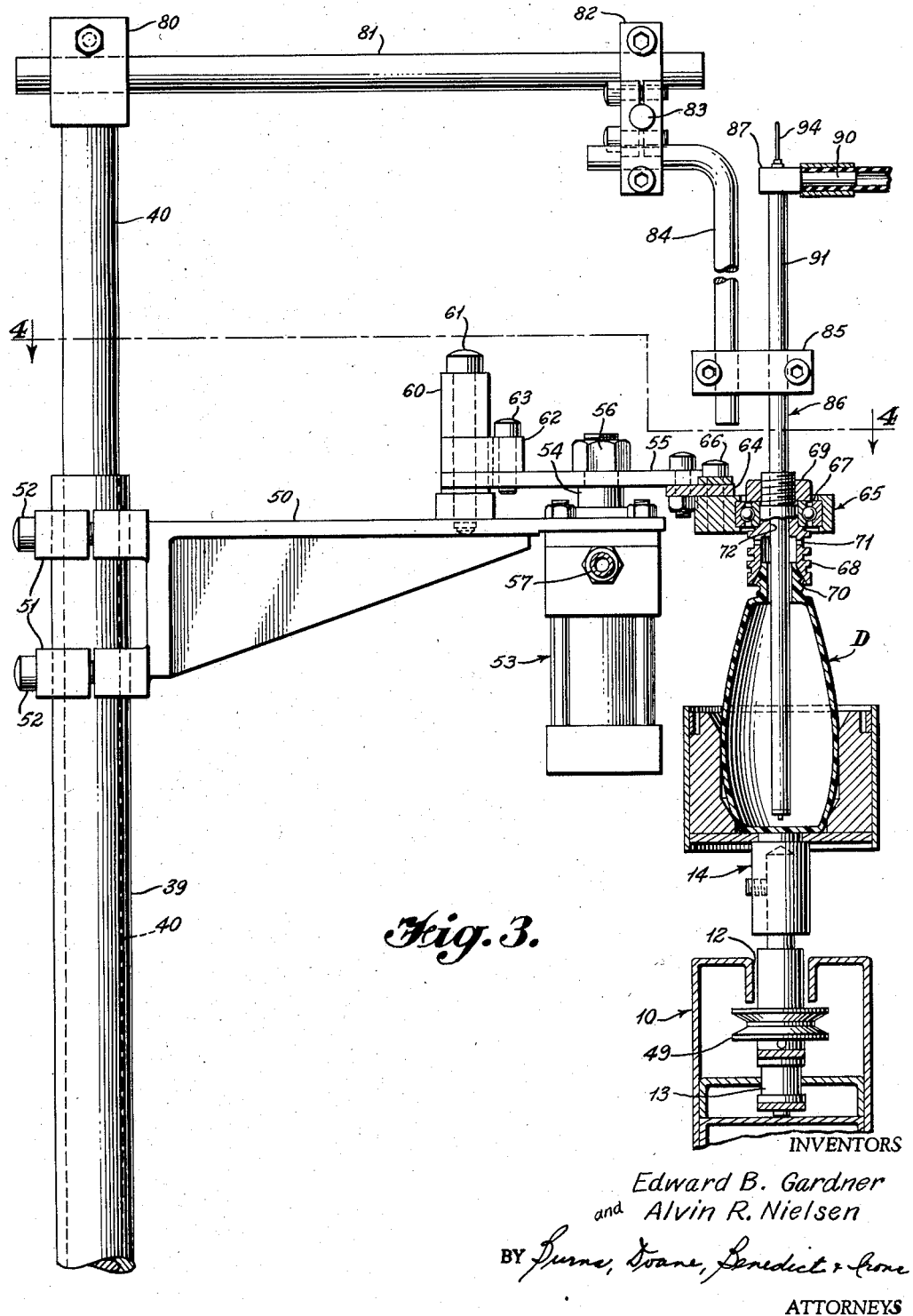
Figure 3 is a detailed elevational view of the first treatment station with parts thereof shown in section.

Figure 3 illustrates the devices carried by and movable with carriage 38 of unit 35 which cooperate with the containers to be treated as they continuously move through the treating station. As shown on this figure a container in the form of a bottle D is mounted in the pocket provided by container support 14. A bracket 50 is secured to upwardly extending column 39 by clamps 51 by means of cooperating bolts 52. As described, column 39 extends upwardly from carriage 38 and thus moves laterally back and forth with such carriage without partaking of any reciprocatory movement. An air cylinder 53 is mounted on the end of bracket 50 with its piston 54 extending upwardly and carrying at its upper end a plate 55 secured thereon by nut 56 threaded onto the end of piston 54. An air inlet tube 57 is connected to the upper end of cylinder 53 to admit air pressure into the cylinder to retract piston 54. A suitable spring-biasing means (not shown) may be provided within cylinder 53 to extend piston 54 upon release of air pressure.

A square stud 60 is secured on bracket 50 by cap screw 61. A guide element 62 is mounted on plate 55 by screws 63 and engages with stud 60 to guide movement of plate 55 and preclude rotation thereof about the axis of piston 54.

The end of plate 55, opposite element 62, has connected thereto a support bar 64 by suitable threaded fasteners. A baffle and container holding device 65 is mounted on each end of bar 64 by means of screws 66. Each of these devices includes an anti-friction bearing 67 with the outer race thereof secured in the holder attached to bar 64 and the inner race mounting a sleeve 68 fastened to the inner race by a nut 69 threaded onto the threaded exterior of the sleeve. The lower end of the sleeve, as shown in Figure 3, is outwardly flared at 70 to engage with the upper end of the bottle D. A series of radial gas exit openings 71 are formed in the sleeve above the outwardly flared lower end and a center bore 72 provided to receive the nozzle and igniter assembly for introducing and exploding the explosive mixture within bottle D. In the position of the parts as shown on Figure 3 the piston 54 through the action of compressed air introduced through tube 57 is holding the flared lower end of sleeve 68 in engagement with the upper end of bottle D so that such sleeve forms a baffle across the top of the bottle.

Support rod 40 mentioned hereinabove reciprocates relative to column 39 and also partakes of lateral movement along with carriage 38 which carries such column. The upper end of rod 40 has a clamp 80 secured thereon which carries a horizontally extending rod 81. A clamp 82 is fastened on the outer end of rod 81 and carries a crossbar 83 which in turn supports at its opposite ends a pair of angle rods 84. A clamp 85 is mounted at the lower end of each of the angle rods 84 to provide a means of support for nozzle and igniter assemblies 86.

The details of construction of each nozzle and igniter assembly 86 are more clearly shown in Figures 5 and 6. From these figures, it will be seen that the assembly includes a header 87 which provides an interior chamber 88 into which is introduced a combustible gas through a tube 89 and a combustion supporting gas through a tube 90. The tubes 89 and 90 introduce the respective gases into chamber 88 in a generally tangential manner in opposition to each other so that effective mixing of the two gases is achieved within the chamber. A sleeve 91 having a series of perforations 92 extends downwardly from header 87 generally normal to the plane of tubes 89 and 90. Sleeve 91 communicates at its upper end with chamber 88. A tube 93 extends downwardly through sleeve 91 concentrically therewith and houses an electrode 94 insulated along its length by a suitable insulating material 95. The tip 96 of electrode 94 extends beyond the insulating material 95 and forms a spark gap with an annular ring 97, which ring seals and joins the lower ends of sleeve 91 and tube 93.

It will be seen from the description of the nozzle and igniter assembly as given hereinabove that the combustible gas and combustion supporting gas introduced through tubes 89 and 90 will mix in chamber 88 to form the explosive mixture to be introduced into the container. This gas mixture will flow downwardly through the annular space between sleeve 91 and tube 93 and outwardly through the perforations 92. The brackets and rods which are mounted on support rod 40 enable positioning of assemblies 86 so that downward reciprocation of rod 40 will result in each assembly being inserted through the bore 72 in one of the baffle and container holding devices 65 and thence into the container D positioned beneath the particular device 65.

It will be noted that carriage 38 supports a pair of baffle devices 65 and a cooperating pair of nozzle and igniter assemblies 86. These elements are spaced so as to cooperate with the containers to be treated so that upon each actuation of carriage 38 two containers will be simultaneously subjected to the explosion action to produce the interior surface oxidation. Obviously, if desired, the invention may be carried out by treating only a single container for each pass of carriage 38 or by providing the requisite additional parts, more than two containers may be simultaneously treated.

Further, with reference to the construction of assemblies 86, it will be appreciated that within the scope of this invention a volume of a premixed explosive mixture may be supplied by a single tube to such assemblies and only a single perforated nozzle sleeve provided to distribute such pre-mixed explosive mixture into the container.

As illustrated on the specific structural embodiment shown in Figures 1 and 2, an enclosure booth 100 is provided having one side thereof open to permit access to adjust and repair the mechanisms mounted at surface oxidizing station A. Further, as shown, booth 100 is provided with a stack 101 which has mounted therein a motor driven fan unit 102 to withdraw air from the booth during operation of the apparatus.

A platform 103 is shown secured on the side wall of booth 100 to provide a mounting for the gas metering units, which control measuring and admitting of gases to the nozzle and ignition assemblies 86, and also mount the other control elements for treatment station A.

As shown on Figures 1 and 2 a series of similar units 104, 105, 106 and 107 are mounted on platform 103. Each of these units controls the measuring and admitting of one of the gaseous components of the explosive mixture to one of the assemblies 86. The details of construction of one of these units is shown in detail on Figure 7. Each unit includes a solenoid inlet valve 108, a solenoid outlet valve 109 and a volumetric measuring device 110 connected between the inlet and outlet valves. Such device has a chamber 111, the volume of which is determined by a piston 112 slidably received therein and movable into and out of the chamber by means of a threaded adjusting screw 113 having lock-nuts 115 cooperating with a frame 114. Thus, the volumetric capacity of chamber 111 may be varied by moving piston 112 into or out of the device as desired. A suitable pressure gauge 116 communicates with chamber 111 to provide an indication of the gaseous pressure admitted thereinto upon opening of inlet valve 108. The inlet for valve 108 is connected by a suitable tube 117 to the pressurized source of the particular gas which is to be admitted to assembly 86. Similarly, a tube 118 connects the outlet of valve 109 with tube 89 or 90 of one of the assemblies 86.

Figure 7:
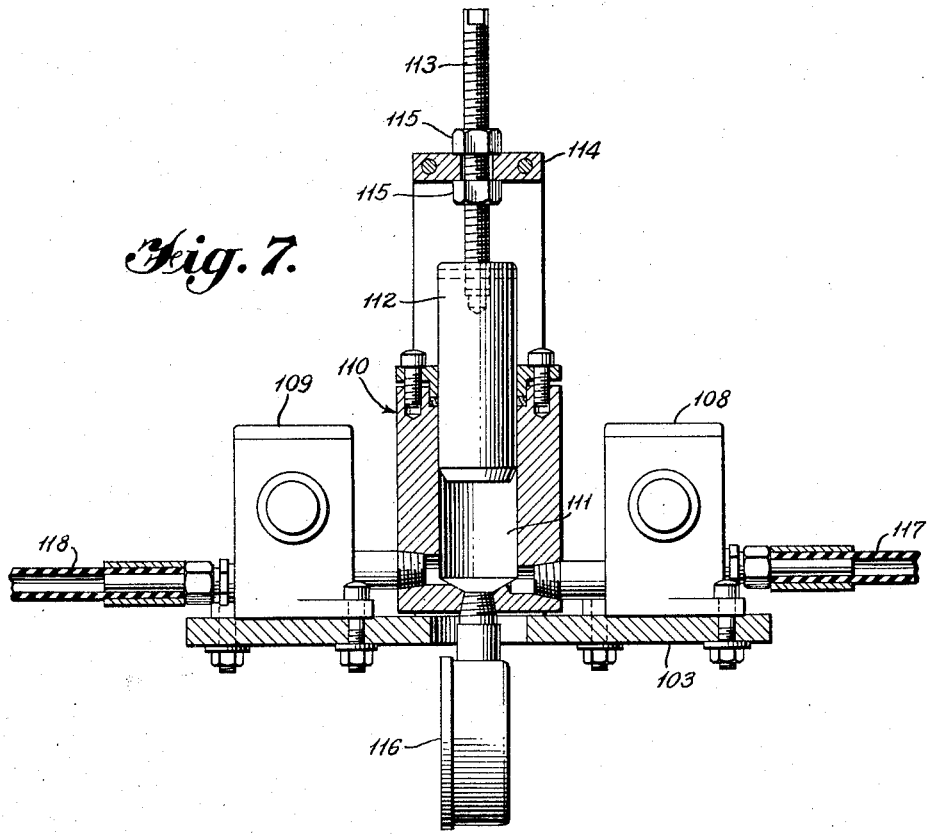
Figure 7 is a partial sectional view of one of the gas metering units.

Considering the group of gas metering units, which each take the form as shown in Figure 7 and described above, the outlets of two of such units are connected to the tubes 88 of the pair of assemblies 86. The inlets for these two units are connected to a combustible gas supply, such as propane, which provides a predetermined pressure of the gas at the inlet of the units. The outlets of the other two units are connected to tubes 89 of the pair of assemblies 86 and have their inlets connected to a combustion supporting gas, such as oxygen, under a predetermined pressure. It will thus be seen that with the pistons 112 positioned in each device 110 to provide chambers 111 of the units of substantially the same volume, the proportions of the gases admitted to the assemblies 86 to produce the explosive mixture will be dependent on the ratio of the pressures of the combustible gas to the combustion supporting gas. Thus, when the inlet valves 108 open, the gases will flow into chamber 111 under pressure. Thereafter, upon closing valves 108 and opening outlet valves 109, the gases will expand out of the chambers to mix and be discharged from assemblies 86. In actual practice it has been found that an effective explosive mixture is achieved where the chambers 111 are of substantially the same volume and the pressure of the oxygen supply to the gas metering units is about four and a quarter times the propane pressure, resulting in a 4¼ to 1 ratio of the gases in the explosive mixture.

Also mounted on platform 103 is a solenoid valve 120 with the inlet thereof connected to a suitable air pressure source (not shown) and the outlet connected to air cylinder 53 by means of tube 57. Solenoid valve 120 also includes a relief port so that when the valve is closed, cutting off admission of air pressure to cylinder 53, the air within the cylinder will be vented to atmosphere so that the plate 55 carried by the piston of cylinder 53 will be raised to lift the baffle devices 65 out of engagement with the containers.

As shown in Figure 2 a suitable ignition transformer 125 is mounted on the underside of platform 103. The secondary of such transformer is connected to the electrodes 94 of assemblies 86 so that upon appropriately timed energization of the transformer a charge will be applied between the electrode tip 96 and ring 97 of each assembly 86 resulting in a spark being produced to ignite the explosive mixture introduced into the containers being treated.

Reference will now be had to timer 25 which as mentioned hereinabove is driven along with the rest of the apparatus by motor 15 so that operation of the timer will be synchronized with operation of the other machine elements. Timer 25 may be of any suitable well known design and the details of its internal construction have not been specifically illustrated on the drawings. Such timer includes a series of switches which are intermittently opened and closed in synchronization with the speed of operation of the apparatus to appropriately energize the parts for admitting the explosive mixture into the containers and exploding such mixture at the proper time as the containers pass through treatment station A. Merely by way of example, the timer 25 may take the form of a rotating shaft driven at a speed proportional to the rotation of shaft 17 and carrying thereon cams positioned to actuate individual switches for making and breaking the circuits in effecting the desired control operation. The control wires leading from timer 25 are shown enclosed in a conduit 126 and connected to the various solenoid valves and the transformer 125 mounted on platform 103.

Reference will now be had to the operation and functioning of the parts at treatment station A. As the chain 13, driven by motor 15, carries the bottles D to be treated on supports 14 through treatment station A, carriage 38 moves back and forth and support rod 40 reciprocates in synchronization with the movement of bottles D through the station, all as described and more fully set forth in the hereinabove Paasche Patent 2,547,884. In each cycle of operation of carriage 38, rod 40, which carries the nozzle and igniter assemblies 86, moves to insert the assemblies into the bottles D, move them along with such containers for a part of their path of travel through the station and then remove the assemblies and return them laterally to be inserted into a subsequent pair of containers moved into the treatment station. Before the assemblies 86 are introduced into a pair of containers to be treated as carried by supports 14, the baffle and container holding devices 65 are moved downwardly into engagement with the top of such containers to restrict the open mouth of the containers against the exit of the gaseous mixture subsequently introduced into such container and to prevent dilution of such mixture adjacent the neck of the container. The actuation of devices 65 is effected by admitting air pressure to cylinder 53 which in turn is controlled by opening of solenoid valve 120 to connect tube 57 with a source of air pressure.

With devices 65 properly positioned, assemblies 86 are inserted, by continued operation of unit 35, into the containers preparatory to the introduction of the explosive gaseous mixture. To admit the proper proportions of the combustible gas and the combustion supporting gas which make up the explosive mixture, the inlet valves 108 of units 104, 105, 106 and 107 are opened with the outlet valves 109 of these units closed. Thus, the appropriate pressurized gas will be admitted into the respective chambers 111. Valves 108 are closed and outlet valves 109 opened to direct the gases to the assemblies 86 where mixing takes place and the gases are introduced into the containers by way of perforations 92.

While the nozzle and igniter assemblies 86 are still positioned within the containers being treated, the transformer 125 is energized to produce sparks between each tip 96 and ring 97 on assemblies 86.

Figure 8:
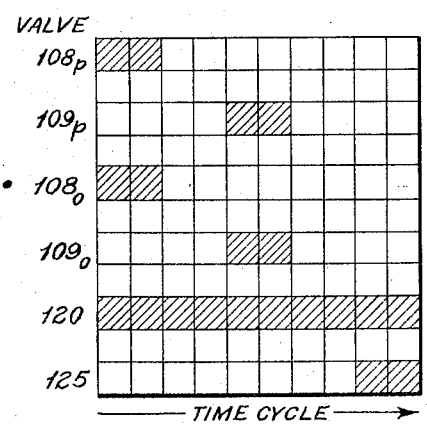
Figure 8 is a schematic diagram showing the timing of operation of the parts at the first treatment station.

Figure 8 diagrammatically illustrates the timing of the operation of the valves and ignition for a single pass of carriage 38 along with one pair of containers being treated at station A. For purposes of simplicity, the diagram illustrates the energization of those valves operated to control introduction of the explosive mixture to only one of the assemblies 86. The shaded portions on such diagram are employed to designate the portion of the pass of carriage 38 during which the switches in timer 25 are closed. The subscript P is used to identify the inlet and outlet valves which control the flow of the combustible gas, such as propane, into and out of chamber 111 of one of the control units. The subscript O is used to designate the inlet and outlet valves which control the flow of the combustion supporting gas, such as oxygen, into and out of the chamber 111 of one of the other control units.

It will thus be seen with reference to Figure 8 that initially timer 25 energizes inlet valves $108_P$ and $108_O$ to admit oxygen into the chamber 111 of one control unit and propane into the chamber 111 of another control unit. At the same time the valve 120 is energized by the closing of a switch in timer 25 to admit air pressure to cylinder 53 so that the baffle and bottle holding devices 65 will be moved down into engagement with the tops of the bottles to be treated. As the apparatus continues its operation driven by motor 15, timer 25 deenergizes valves $108_P$ and $108_O$ to close such valves and thereafter opens outlet valves $109_P$ and $109_O$ to permit the propane and oxygen in the separable chambers 111 to flow to the nozzle and igniter assembly 86 with which they are connected. The gases mix in the chamber 88 of assembly 86 and exit into the bottle D through perforations 92. At this stage of movement of the containers through station A, unit 35, also driven by motor 15 will have moved assemblies 86 down into the bottles to be treated. The valves $109_P$ and $109_O$ are closed and after a brief interval, timer 25 completes a circuit to transformer 125 to cause a spark to jump across from the tip 96 of electrode 94 to ring 97 thereby igniting and exploding the mixture present within the containers being treated, resulting in the interior walls of such containers being oxidized or otherwise appropriately modified in preparation for the application of the coating which forms the container liner.

It is to be noted that as used herein, the term exploding shall be considered to embrace detonation and deflagration of the explosive mixture introduced into the container to be treated.

During the occurrence of the above set forth steps, the valve 120 remains open so that devices 65 are held in engagement with the bottles D and device 45 engages the supports 14 to rotate the bottles so that the explosive mixture and subsequently the explosion products sweep the interior of the bottles for more effective surface treatment. Upon completion of the pass of carriage 38 along with the containers moving through treating station A and during which pass the interior walls of the containers have been oxidized or otherwise modified by the explosive treatment, the timer deenergizes solenoid valve 120 and transformer 125, support rod 40 raises the nozzle and igniter assemblies 86 out of the containers and the return movement of carriage 38 carries the parts back to pick up and treat the next succeeding pair of containers.

The bottles D carried by supports 14 move out of treatment station A where the interior walls thereof have been oxidized and into treatment station B. Station B includes a water wash booth 130 having a stack 131 with a fan unit 132 for drawing air from and through the booth. A water pump 133 driven by a motor 134 provides a wash water supply through which the atmosphere is drawn to filter out the overspray of coating particles produced by the spray apparatus mounted within the booth 130.

A pair of units 135 and 136 are mounted immediately adjacent the path of movement of bottles D through the treatment station. These units may take the form of construction as described in connection with unit 35 associated with treatment station A. More specific details of the operation and functioning of these units may be found in the disclosure of Paasche Patent 2,547,884. Suffice it to state that each unit is mounted to be operable in conformity with the speed of movement of the containers to be coated through the treatment station so that the spray nozzles carried by such units will be moved down into the containers and along with the course of movement of such containers during the spraying action and raised from the containers immediately prior to the return movement of the carriage on which they are carried for cooperation with the next pair of containers to be coated.

Each unit 135 and 136 carries a pair of spray nozzles 140 which are positioned on the respective units at appropriate spacing to cooperate with a pair of containers to be coated so that upon each actuation of the particular unit, two containers will be coated by the spray nozzles. In addition to Paasche Patent 2,547,884, reference may be had to Paasche Patent 2,059,706 for more specific details as to the construction and operation of spray nozzles 140. The spray nozzles 140 on unit 135 are connected to a pressurized coating material supply tank 141 and spray nozzles 140 on unit 136 connected to a suitable pressurized coating material supply tank 142. The construction and operation of such supply tanks for feeding a coating material to spraying devices is old and well known and, accordingly, the details of construction of such apparatus are not shown on the drawings. By way of illustration of such an apparatus associated with an automatic coating machine, reference may be had to Paasche Patent 2,069,844.

To effect rotation of the containers as they pass through treatment station A, there is provided a drive unit 145 positioned adjacent unit 135 and a drive unit 146 positioned adjacent unit 136. These drive units may be similar in construction to the unit 45 described hereinabove and may take the form of such units as described in Paasche Patent 2,547,884. As in the case of unit 45, drive units 145 and 146 rotate the supports 14 and thereby the containers mounted thereon to result in more effective coating of the entire interior of the containers.

In the specific structure illustrated, the two units 135 and 136, each of which carries a pair of nozzles to coat two containers simultaneously, are provided to insure effective coating where the container takes the form of a bottle having a reduced neck or shoulder adjacent the bottle mouth such as the form of bottle D shown in section on Figure 3. To insure complete coating of this type of bottle, the spray nozzles 140, carried by unit 135, are provided with nozzle orifices directing the spray of coating material laterally and downwardly so that, as the nozzles are introduced into the bottles and coating material sprayed therefrom, the inner surface of such bottles, with the exception of the shoulder adjacent the mouth of the bottle, will be coated. The spray nozzles 140 carried by unit 136 are provided with nozzle orifices directing a spray laterally and upwardly with respect to the lower end of such spray nozzles. Accordingly, the spray nozzles on unit 136 will be effective to spray the shoulder immediately below the neck and open mouth of the bottle. Thus, by the combined two-step spraying, with the main portion of the bottles being coated by the spray nozzles on unit 135 and the shoulder immediately below the bottle mouth being coated by the spray nozzles on unit 136, a complete coating of the bottle interior is achieved.

Although two separate units 135 and 136 have been illustrated on the drawing, it will be appreciated that where effective coating of the entire bottle interior can be achieved by utilization of a single nozzle having a particular nozzle orifice character, the second unit is not necessary.

To time the operation of the spray nozzles 140 so that the coating material is sprayed therefrom at the proper time in synchronization with the course of movement of the containers through the treatment station B, there is provided a timing mechanism, indicated by 147 on Figure 1, to control spray nozzles 140 on unit 135 and a similar timing mechanism 148 provided to control appropriate operation of the spray nozzles carried on unit 136. The details of construction of these timing mechanisms are not shown or described herein, a suitable mechanism for effecting such timed control being shown and described in Paasche Patent 2,547,884.

After the containers have been coated at treatment station B, they are moved by chain 13 beneath the perforated conduit 30 which, as heretofore described, directs streams of air downwardly into the containers to purge and promote evaporation of the volatile constituents of the coating material. The containers carried on supports 14 proceed along with the movement of chain 13 into the treatment station C which includes an oven 150 wherein suitable means are provided to produce the requisite heating temperature to dry the coating material and, if necessary or desirable, to cure it to form it into the desired impermeable lining within the container. As the containers pass out of oven 150 as moved therefrom by chain 13, the operator of the apparatus may remove the containers from the supports and position unlined containers on the supports to be carried through the successive treatment stations for the application thereto of the desired impermeable lining.

It will be readily appreciated that the general method of the invention can be practiced by hand or by any appropriate apparatus other than that shown in the drawings.

Methodwise, the invention generically embraces modifying the interior surfaces of a container fabricated from natural or synthetic resinous material to render such surface hydrophillic or otherwise receptive or adherent to coating materials, particularly polar compounds or compositions by exploding an explosive material therewithin. The method of the invention is applicable to rigid or flexible containers fabricated from substantially all types of thermoplastic and thermosetting synthetic resins. More specifically, the invention is applicable to containers fabricated from polyethylene, including conventional polyethylene and the so-called new type low temperature polyethylene, such as Ziegler polyethylene, polymethylene or polyethylene substantially free of branched chains, polyethylene terephthalate, polytetrafluoroethylene, nylon, acetate copolymers, ethylene-polyvinyl acetate copolymers, epoxy resins, coumarone resins; indene resins; acetylene polymers, including their halogenated derivatives; polymers of olefin hydrocarbons other than ethylene, including polymers of isoprene, butadiene and their homologs, and halogen substituted derivatives thereof; olefin-sulfur dioxide resins; phenol-aldehyde resins; aldehyde resins; furfural resins; ketone resins; urea-formaldehyde type resins, including thiourea-formaldehyde, melamine-formaldehyde, and dicyandiamide-formaldehyde resins; amine-aldehyde resins; sulfonamide-aldehyde resins; nitro-resins; resins from such nitrogen-containing materials as hydrazine and related substances, pyrazoles, pyridine, quinoline, pyrrole, indole, and carbazole; condensation polyester resins, including resins obtained from polyhydric alcohols and polybasic acids, and from hydroxy-acids; polyamide resins and derivatives thereof; mixed polyester-polyamide resins; polyether resins; polyvinyl ethers; polyvinyl alcohols; polyvinyl esters; rubber and its derivatives; cellulose esters, and cellulose ethers. These may be modified with any of the usual modifying agents including plasticizers, pigments, fillers, dyes, and materials which combine chemically with the polymer ingredients either during formation of the polymer or during an after treatment. Thus, containers fabricated from copolymers, interpolymers, and mixtures of polymers can advantageously be treated by the process of this invention. The art is well familiar with the various types of resinous materials which can be employed to form containers. All such materials are contemplated by the invention.

The invention finds most significant application when employed to modify the interior surface of a container fabricated from a normally hydrophobic synthetic resinous material to render such surface receptive or capable of forming a strong bond with polar compounds, both monomeric and polymeric, particularly polar film-forming materials and dyes. The interior surface of the container may, in the course of the process, be rendered hydrophilic or pass through a hydrophilic stage and then assume a coating-receptive hydrophobic condition. Typical of such generally hydrophobic resins are polyethylenes, nylons, natural and synthetic rubbers, polystyrene, and various synthetic hydrocarbon polymers including particularly olefin and diolefin polymers and copolymers and the like.

The invention is generically applicable to the modification of the interior surfaces of containers manufactured from normally hydrophobic resins of which the foregoing list is illustrative only.

Similarly, substantially any type of explosive composition can be employed. Preferably a mixture of a gaseous fuel, more particularly a gaseous hydrocarbon fuel, with air or other free oxygen supplying gas is employed. Typical gaseous fuels which can be utilized include propane, ethane and natural gas, and the like. A mixture of propane and free oxygen is a preferred species of explosive composition and specifically a mixture of about one part by volume of propane to five parts free oxygen by volume is used. Mixtures of propane and air are a species of explosive composition useful in the invention. More specifically, a mixture containing from about $\frac{1}{20}$ to about $\frac{1}{25}$ part by volume of propane for each volume of air is most appropriately employed. Combustible mixtures of liquid fuels or vaporized liquid fuels and air or other free oxygen containing gas can be employed. Representative of such fuels are the combustible hydrocarbons such as gasoline, kerosene, and the like. Solid explosive materials such as gun powders, dynamite, and the like can be utilized. It will be appreciated that the explosive charge which is employed in the process of the invention must be regulated to preclude destruction of the container in which the charge is ignited.

The invention is unrestricted with respect to the compound composition or material applied to the interior surfaces of containers which have been modified in accordance therewith. Generally, such materials are applied in the form of solutions, suspensions, dispersions or the like in a liquid medium which can be volatilized. A significant aspect of the invention embraces the application of film-forming materials to the modified interior surfaces of containers. Such film-forming materials, which normally are natural or synthetic resins, are generically embraced by the invention. Reference is made to the list of resinous materials hereinbefore recited as representative of material from which containers can be fabricated for an enumeration of film forming resins which can be employed. The art is well cognizant of the various film forming materials, which are generically contemplated, hence a more exhaustive list is not presented.

Film forming materials such as those above referred to are most appropriately employed in conventional form as a solution thereof in volatile solvent media. Coating compositions embracing solutions of film forming resinous materials in volatile solvents are widely known and are generically embraced by the invention.

In the embodiment of the invention which is addressed to the application of a coating to the interior surface of a container fabricated from normally hydrophobic resinous material, which surface has been modified to impart hydrophilic properties thereto, polar coating materials, including polar film forming resinous materials are preferred. A commercially significant application of this feature of the invention resides in the application to the modified interior surfaces of containers fabricated from polyethylene, nylon and the like, of a liner or coating which is impermeable to materials with respect to which the unmodified or uncoated resin from which the container is fabricated is permeable. The preferred film forming resins useful such purposes are polar compositions, which are cured or set, as by the application of heat or on standing, after the coatings or liners of such materials have been formed on the modified interior walls of the container. Film forming resinous materials which have been found to be particularly useful for forming such liners include the various epoxy resins, mixtures of vinyl ester-vinyl alcohol copolymers with urea-formaldehyde resins of intermediate stage, polyacrylonitrile resins, polyamide resins such as the nylons, acrylonitrile-styrene copolymers and the like. One specific solution of a coating material found effective for use in the invention includes a mixture of a vinyl chloride-vinyl acetate-vinyl alcohol copolymer containing about 91% by weight vinyl chloride, about 3% by weight vinyl acetate and about 6% by weight vinyl alcohol together with a commercial urea-formaldehyde resin, the two polymeric materials being dissolved in an amount requisite to provide a solution containing about 20% by weight of solids in a mixture containing substantially equal proportions of toluene and methylethylketone.

Representative non-curing or non-thermosetting resins which can be employed include polyvinyl alcohol, which can be appropriately employed in aqueous solution, for example an aqueous solution containing 10% to 20% by weight of polyvinyl alcohol; aqueous solutions, suitably in like concentration of copolymers of methyl vinyl ether and maleic anhydride, such copolymers normally containing from about 1 to 99% maleic anhydride, solutions of nylons in low molecular weight aliphatic alcohols, such as methyl ethyl and propyl alcohol, in a preferred concentration of about 15 to about 20% by weight of nylon and the like. The particular coating composition which is employed does not constitute an essential aspect of this invention which is generically applicable to the utilization of all such compositions.

The curing of thermosetting type coating compositions can be effected in any desired manner by subjecting the bottles to which the coatings have been applied to an appropriate temperature for a period of time requisite to set the desired adhesive. The conditions requisite to effect setting of the thermosetting type adhesives with which this invention is used are known to the art and need not be here defined. Generally speaking, a temperature from about room temperature to about 200° F. for a time period of from about five minutes to about three hours can be employed.

Example I

Motor 15 was started to drive the chain 13, units 35, 135 and 136, timer 25, and the sprayer timing mechanisms 147 and 148. Movement of chain 13 within the slot 12 carried the supports 14 around frame 10 and successively through the various treatment stations.

Polyethylene bottles were placed in the pockets of the supports 14 as they passed the loading station moving toward the entrance to treatment station A. As the bottles, carried by supports 14, moved in succession into and through treatment station A, the operation of unit 35 effected movement of one of the nozzle and ignition assemblies down into each bottle, moving the assembly along with the particular bottle in which it was positioned for a predetermined portion of the travel of the bottle through the station. At the end of such portion of travel with each bottle, unit 35 withdrew the assembly from the particular bottle, returning the assembly for introduction into the next succeeding bottle to be treated. Likewise, during movement of the bottles in succession through station A, device 45 engaged supports 14 to rotate the bottles for the predetermined portion of the travel.

While the nozzle and ignition assembly 86 was positioned with its lower end in each bottle as it passed through the treatment station A, the baffle device 65 was engaged with the top of the bottle and an explosive mixture consisting of 4¼ parts by volume oxygen and 1 part by volume propane was injected into the bottle through perforations 92 on the assembly.

The explosive mixture was ignited within the bottle as it moved through station A by energization of transformer 125 which caused a spark to jump between the end of electrode 94 and ring 97 on the assembly disposed within the bottle being treated. Thus, the interior wall surfaces of the bottles were modified to be receptive to adherence of the coating material.

A solution to form a coating material, consisting of a mixture of a vinyl chloride-vinyl acetate-vinyl alcohol copolymer containing about 91% by weight of vinyl chloride, about 3% by weight vinyl acetate and about 6% by weight vinyl alcohol, was prepared with a commercial urea formaldehyde resin. In preparing the coating material solution, the two polymeric materials were dissolved in an amount requisite to provide a solution containing about 15–18% by weight of solids in a mixture with substantially equal proportions of toluene and methylethyl ketone.

The coating material solution was placed in tanks 141 and 142. As the bottles moved into and through treatment station B, as carried by supports 14 on chain 13, units 135 and 136 caused the spray nozzles carried thereby to move into and out of the bottles accompanied by lateral movement of the nozzles so that the nozzles moved in unison with the bottles as they passed continuously through the station. Further, drive units 145 and 146 effected rotation of the bottles during their movement with the respective nozzles 140 and 141.

Operation of the sprayer timing mechanisms 147 and 148 effected operation of the spray nozzles so as to spray coating material therefrom when the nozzles were moving within the bottles passing in succession through station B. The nozzles 140 were provided with nozzle tips to spray coat the central and lower sections of bottles and the nozzles 141 had tips for spraying the upper section including the shoulder below the restricted neck of the bottles.

After the bottles had their interiors spray coated in station B, movement of supports 14 carried the bottles beneath perforated conduit 30 where drying air was directed downwardly into the bottles to promote evaporation of the volatile solvents from the coating material. Thereafter the bottles were moved into a curing oven where the bottles were subjected to a curing temperature of about 200° F. for a period of about twenty minutes during their movement through the oven.

A bottle treated as outlined above and a control bottle which was untreated were filled to shoulder level with Squibb's mineral oil. The control bottle collapsed and acquired an oily surface on its exterior whereas the lined bottle did not collapse or acquire the oily surface characteristic. The test was carried out at a temperature of 120° F. for 72 hours before collapse. The collapsed bottle acquired an oily outer surface after seven to ten days total testing time.

Example II

The process of Example I was repeated with the exception that in this instance an alcohol solution of nylon (Dupont FM 8001) in ethyl alcohol in an amount sufficient to provide about 15% by weight of solids was employed. The coated bottles were dried by volatilization of the alcohol. No curing step was employed.

Example III

Example II was repeated with the exception that in this instance there was employed a solution containing about 10% by weight of polyvinyl alcohol in water.

Example IV

Example I was repeated with the exception that the coating solution was applied by filling by hand the treated polyethylene bottles approximately half full with the solution followed by pouring by hand the solution from the bottles with an eccentric motion to coat the entire interior surface. The bottles so coated were drained for 60 to 90 seconds and then cured in an erect position at a temperature of about 200° F. for about one hour followed by an after cure at room temperature for about four to seven days. A bottle so treated and a control bottle which was untreated was filled with a water-mineral oil emulsion containing about 97% by weight mineral oil and also containing about 3% by weight of essential oils. The test was carried out at a temperature of 130° F. The unlined test bottle collapsed in 72 hours. No collapse of the lined bottle occurred after 30 days. An oily outer surface was noted on the unlined bottle but not on the lined bottle.

While this invention has been described particularly with reference to the application of liners to the interior of polyethylene bottles to impart improved resistance to penetration of various materials through the walls of such bottles, it will be appreciated that the invention is applicable for other purposes. For example, in many instances it is desired to apply to the interior of such containers a pigmentation or color. Such an effect can be achieved through the practice of this invention by treating the interior of the bottle walls in the method described followed by application to the so treated walls of a pigment carrying composition. Similarly, it may be desired to apply materials having various physical or chemical properties to the interior of the container walls. More particularly, it is contemplated to apply to the interior of containers by the method of this invention antioxidant or anticorrosive materials which are effective to maintain or stabilize compositions which are stored within such bottles. Accordingly, the invention is not restricted to the application of liners of film-forming coating materials to the modified interior surfaces of containers.

We claim:

1. Apparatus for treating the interior walls of containers comprising a support for carrying a container during treatment, nozzle means mounted with respect to said support to provide a space therebetween sufficient to receive a container to be treated, said nozzle means being movable into the container to introduce thereinto a gaseous explosive mixture, conduits connecting the inlet end of said nozzle means with sources of a combustible gas and a combustion supporting gas, valve means in each of said conduits for metering the admission of gases to said nozzle means to provide an explosive mixture, ignition means including a spark gap and transformer means for creating an igniting spark across said gap, said ignition means being mounted to be movable into the container carried by said support, and timer means connected to actuate said valve means to admit a predetermined quantity of said gases into the container as a charge of explosive mixture and thereafter close said valve means, said timer after closure of said valve means energizing said transformer means to create a spark across said spark gap and thereby ignite the charge of explosive mixture in the container.

2. Apparatus for treating the interior walls of containers comprising a support for carrying a container during treatment, nozzle means mounted above said support spaced a distance sufficient to receive a container between said support and said nozzle means, said nozzle means being movable downwardly into the container to introduce thereinto an explosive mixture, conduits connecting the inlet end of said nozzle means with sources of a combustible gas and a combustion supporting gas, valve means in each of said conduits for metering the admission of the gases to said nozzle means to provide an explosive mixture, ignition means including a spark gap mounted adjacent the end of said nozzle means and transformer means for creating an igniting spark across said spark gap, and timer means coupled to said valve means to momentarily open and close said valve means to admit a predetermined quantity of said gases into the container as a charge of explosive mixture and thereafter energize said transformer means to create a spark across said spark gap, said timer means being connected to ignite the charge of explosive mixture in the container, said timer means being operable to effect admission of said gases and creation of said spark after said nozzle means and said spark gap have been moved into the container to be treated.

3. Apparatus for treating the interior walls of containers comprising a container support rotatably mounted to provide for rotation of a container carried by said support about the longitudinal axis of such container, nozzle means insertible into the container for introducing an explosive gaseous mixture into the container, ignition means for igniting and exploding the mixture to modify the interior walls of a container carried on said support, and drive means engageable with said support to rotate said support and the container carried thereby to promote mixing of the explosive mixture and sweep the interior walls of the container with the explosion products.

4. Apparatus for treating the interior walls of containers comprising an endless conveyor carrying a plurality of container supports at spaced positions along the length of said conveyor, a treatment station through which said conveyor extends to transport containers to be lined as mounted on said supports, a unit mounted at said treatment station and having a support member movable laterally for a predetermined distance along with each container as it moves through said station and reciprocable generally normal to the path of movement of said conveyor through said station, drive means connected to said conveyor and said unit to actuate said support member to move in timed relation to the speed of movement of the containers through said station, nozzle means mounted on said support member and positioned directly above the path of movement of said conveyor through said station to be moved downwardly into the container on each of said supports in succession upon reciprocation of said support member, metering means coupled to said nozzle means for admitting an explosive mixture to said nozzle means and thence into the container being treated, ignition means carried by said support member, means operable in accordance with the speed of said drive means to actuate said metering means and said ignition means upon each reciprocation of said support member moving said nozzle means into the containers to be treated to inject through said nozzle means the explosive mixture into the containers and explode such mixture within the containers by energization of said ignition means.

5. Apparatus for treating the interior walls of containers comprising a conveyor carrying a plurality of container supports at spaced positions along the length of said conveyor, a treatment station through which said conveyor extends to transport containers to be treated as mounted on said supports, a unit mounted at said treatment station and providing a support column movable laterally for a predetermined distance along with the containers as they move through said station and a support rod movable with and vertically reciprocable relative to said support column, drive means connected to said conveyor and said unit to actuate said support column and said support rod to move in timed relation to the speed of movement of the containers through said station, a container holding device carried by said support column and having an actuator for moving such device down into engagement with the top of the container on each of said supports in succession, nozzle means mounted on said support rod and positioned directly above the path of movement of said conveyor through said station to be moved down through said container holding device and into the container on each of said supports in succession upon reciprocation of said support rod, metering means coupled to said nozzle means for admitting an explosive mixture to said nozzle means and thence into the container being treated, ignition means carried by said support rod, and means for timing the operation of said actuator, said metering means and said ignition means upon each reciprocation of said support rod.

6. Apparatus for treating the interior walls of containers comprising an endless conveyor carrying a plurality of container supports at spaced positions along the length of said conveyor and rotatably mounted to provide for rotation of the container carried by each support about the longitudinal axis of such container, nozzle means mounted above the path of movement of said supports on said conveyor and movable downwardly into and along with the container on each support as each support moves past said nozzle means, metering means coupled to said nozzle means for admitting an explosive mixture to said nozzle means and thence into the container being treated, ignition means for igniting and exploding the explosive mixture within the container, means connected to operate said metering means and said ignition means as said nozzle means moves along with the container on each support, and drive means engageable with said supports to rotate same and the containers carried thereby to promote mixing of the explosive mixture and sweep the interior walls of the container with the explosion products to promote oxidation of the walls of the containers.

7. Apparatus for lining the interior walls of containers comprising an endless conveyor for holding and transporting the containers to be coated through a succession of treatment stations, a first treament station having nozzle means for introducing an explosive mixture into each container as it passes through said first station and ignition means for igniting the mixture within each container to explode such mixture within said container, and spray nozzle means mounted at a second treatment station to coat the interior surfaces of each container passing therethrough.

8. Apparatus for lining the interior walls of containers comprising an endless conveyor for holding and transporting the containers to be coated through a succession of treatment stations, a first treatment station having nozzle means for introducing an explosive mixture into each container as it passes through said first station and ignition means for igniting and exploding said mixture within each container, means mounted at a second treatment station to coat the interior surfaces of the containers passing therethrough, and heating means mounted adjacent said conveyor to promote curing of the coating after said containers pass from said second treatment station.

9. Apparatus for lining the interior walls of containers comprising an endless conveyor carrying a plurality of container supports at spaced positions along the length of said conveyor, said conveyor providing along its length a plurality of treatment stations through which containers mounted on said supports are moved, a unit mounted at a first treatment station and having a support member movable laterally for a predetermined distance with each container as it moves through said station and reciprocable generally normal to the path of movement of said conveyor through said station, drive means connected to said conveyor and said unit to actuate said support member to move in timed relation to the speed of movement of the containers through said station, nozzle means mounted on said support member and positioned directly above the path of movement of said conveyor through said station to be moved downwardly into the container on each of said supports in succession upon reciprocation of said support member, metering means coupled to said nozzle means for admitting an explosive mixture to said nozzle means and thence into each container being treated, ignition means carried by said support member, means operable in accordance with the speed of said drive means to actuate said metering means and said ignition means upon each reciprocation of said support member, a unit mounted at a second treatment station driven by said drive means and having a support element movable laterally for a predetermined distance with each container as it moves through said second station and reciprocable generally normal to the path of movement of said conveyor through said second station, spray nozzle means mounted on said support element and positioned directly above the path of movement of said conveyor through said second station to be moved downwardly into the container on each of said supports in succession upon reciprocation of said support element, conduit means coupling said spray nozzle means to a coating material supply, and means connected to operate said spray means to coat the interior of each container as the spray nozzle means moves along with the container on each support.

10. Apparatus for lining the interior walls of containers comprising an endless conveyor carrying a plurality of container supports at spaced positions along the length of said conveyor, said conveyor providing along its length a plurality of treatment stations through which containers mounted on said supports are moved, nozzle means mounted at a first treatment station above the path of movement of said conveyor through such station and movable downwardly into each container as it passes through such station, metering means coupled to said nozzle means for admitting an explosive mixture to said nozzle means and thence into each container being treated, ignition means for igniting and exploding the mixture within each container, drive means at said first treatment station engageable with said supports to rotate same and the containers carried thereby to promote mixing of the explosive mixture and sweep the interior walls of the container with the explosion products, spray nozzle means mounted at a second treatment station to coat the oxidized interior surfaces of each of the containers as it passes through said second station, and drive means at said second station engageable with said supports to rotate same and the containers carried thereby to promote complete coating of the interior walls of the containers.

11. Apparatus for lining the interior walls of containers comprising an endless conveyor carrying a plurality of container supports at spaced positions along the length of said conveyor, said conveyor providing along its length a plurality of treatment stations through which containers mounted on said supports are moved, nozzle means mounted at a first treatment station above the path of movement of said conveyor through such station and movable downwardly into each container as it passes through such station, metering means coupled to said nozzle means for admitting an explosive mixture to said nozzle means and thence into each container being treated, ignition means for igniting the mixture within each container to explode such mixture, drive means at said first treatment station engageable with said supports to rotate same and the containers carried thereby to promote mixing of the explosive mixture and sweep the interior walls of the container with the explosion products, spray nozzle means mounted at a second treatment station to coat the oxidized interior surfaces of each of the containers as it passes through said second station, drive means at said second station engageable with said supports to rotate same and the containers carried thereby to promote complete coating of the interior walls of the containers, and purging means connected to a pressurized gas source and mounted above the path of movement of said conveyor after said second treatment station to direct streams of purging gas downwardy into the containers mounted on the supports carried by said conveyor to assist in driving off volatile constituents of the coating material applied at said second treatment station.

12. Apparatus for lining the interior walls of containers comprising an endless conveyor carrying a plurality of container supports at spaced positions along the length of said conveyor, said conveyor providing along its length a plurality of treatment stations through which containers mounted on said supports are moved, nozzle means mounted at a first treatment station above the path of movement of said conveyor through such station and movable downwardly into each container as it passes through such station, metering means coupled to said nozzle means for admitting an explosive mixture to said nozzle means and thence into each container being treated, ignition means for igniting and exploding the mixture within each container, drive means at said first treatment station engageable with said supports to rotate same and the containers carried thereby to promote mixing of the explosive mixture and sweep the interior walls of the containers with the explosion products, spray nozzle means mounted at a second treatment station to coat the oxidized interior surfaces of each of the containers as it passes through said second station, drive means at said second station engageable with said supports to rotate same and the containers carried thereby to promote complete coating of the interior walls of the containers, and heating means mounted adjacent the path of movement of said conveyor following said second treatment station to promote curing of the coating into a lining for the containers.

13. A method of modifying the interior walls of synthetic resin containers to render said walls receptive to a polar film coating comprising the steps of introducing into the container to be treated a gas combustible in oxygen and an oxygen-containing gas in predetermined proportions to produce an explosive gaseous mixture, and igniting said gaseous mixture to explode same within said container to oxidize the interior container walls to make them adherent to a polar film coating.

14. The method of claim 13 wherein the gas combustible in oxygen is a gaseous hydrocarbon and wherein the oxygen-containing gas is air.

15. The method of claim 13 wherein said container is a polyethylene container.

16. A method of treating the interior walls of synthetic resin containers to render them receptive to the application of a polar film coating comprising introducing into the container to be treated a gas combustible in oxygen and an oxygen containing gas in predetermined proportions to produce an explosive gaseous mixture, igniting said gaseous mixture to explode same within said container, and rotating said container during introduction and ignition of said gaseous mixture to promote mixing of the combustible gas and combustion supporting gas and sweep the interior walls of said container with the explosion products.

17. The method of claim 16 wherein said gas combustible in oxygen is a gaseous hydrocarbon and wherein said oxygen containing gas is air.

18. The method of claim 16 wherein said container is a polyethylene container.

19. A method for modifying the interior surface of a synthetic resin container which comprises introducing an explosive oxygen containing mixture into and exploding said mixture within said container to oxidize the interior surface thereof and render said surface receptive to coating compositions containing a polar film-forming material.

20. The method of claim 19 wherein said explosive mixture comprises a mixture of a gaseous hydrocarbon and air.

21. The method of claim 20 wherein said gaseous hydrocarbon comprises propane.

22. The method of claim 19 wherein said film-forming material is a synthetic resin.

23. The method of claim 19 wherein said synthetic resin container is a polyethylene container.

24. The method of claim 19 wherein said synthetic resin container is fabricated from a normally hydrophobic synthetic resin and wherein the interior surface of the walls of said container is at least partially oxidized by exploding said mixture.

25. A method of lining the interior of synthetic resin containers comprising introducing an explosive oxygen containing mixture into the container to be lined, thereafter exploding said mixture to form an oxidized coating-adherent interior surface in said container, and applying a coating to at least a portion of said surface.

26. The method of claim 25 wherein the synthetic resin container is a polyethylene container.

27. The method of claim 25 wherein said explosive mixture is a mixture of a gaseous hydrocarbon and air.

28. The method of claim 25 wherein said container is a polyethylene container and wherein said coating is a solution in a volatile solvent of a polar film-forming material.

29. The method of claim 28 wherein said coating is cured subsequent to application to the modified interior surface of said container.

30. A method of lining the interior of synthetic resin containers with a polar film-forming synthetic resin comprising the steps of introducing into the container to be lined an explosive oxygen containing mixture, exploding said mixture within the container to oxidize and render the interior surfaces of the container walls receptive to polar compositions, spraying a coating material containing a polar film-forming synthetic resin on the interior walls of said container, said container being rotated during at least a portion of one of said introducing, exploding and spraying steps to provide a lining firmly adhered to the interior container walls.

31. The method of claim 30 wherein said synthetic resin container is a polyethylene container.

32. The method of claim 30 wherein said explosive mixture is a mixture of a gaseous hydrocarbon and air.

33. The method of claim 30 wherein said lining is cured subsequent to application to the interior walls of said container.

34. A method of lining the interior of synthetic resin containers with a polar film coating comprising the steps of introducing into the container to be lined an explosive oxygen containing mixture, exploding said mixture within the container to oxidize the container walls and render such walls receptive to a polar film coating, spraying a polar coating material into said container to line the interior walls, rotating the container during at least a portion of one of the above introducing, exploding and spraying steps, and heating said container to cure the coating into a lining firmly adhered to the interior container walls.

35. The method which comprises introducing an explosive oxygen containing material into a container fabricated from a normally hydrophobic synthetic resin and exploding said material within said container to oxidize and render more hydrophilic at least a portion of the surfaces of the interior walls of said container.

36. The method of claim 35 wherein said container is a polyethylene container.

37. The method of claim 35 wherein said explosive material is a mixture of a gaseous hydrocarbon and air.

38. The method of claim 35 wherein there is applied to the treated interior surfaces of said container a coating of a normally film-forming polar composition.

39. The method of claim 38 wherein said coating is cured subsequent to application to the interior walls of said container.

40. The method of claim 39 wherein said coating is raised to an elevated temperature to effect curing thereof.

41. In an apparatus as recited in claim 5 wherein said actuator includes an air cylinder carried by said support column and connected to said container holding device to move it into engagement with the container being treated upon introduction of air into said air cylinder.

42. In an apparatus as recited in claim 5 wherein said container holding device has a portion engageable with the top of the container, said portion being rotatably mounted to permit the container and said portion to rotate during at least a part of the container treatment.

43. Apparatus for lining the interior walls of containers comprising conveyor means for holding and transporting the containers to be coated through a succession of treatment stations, a first treatment station having nozzle means for introducing an explosive mixture into each container as it passes through said first station and ignition means for igniting the mixture within each container to explode such mixture within said container, and means mounted at a second treatment station to coat the interior surfaces of each container as it passes therethrough.

44. Apparatus for lining the interior walls of containers comprising conveyor means for holding and transporting the containers to be coated through a succession of treatment stations, a first treatment station having nozzle means for introducing an explosive mixture into each container as it passes through said first station and ignition means for igniting and exploding said mixture within each container, means mounted at a second treatment station to coat the interior surface of the containers as they pass therethrough, and heating means mounted adjacent said conveyor means to promote curing of the coating after the interior surfaces of the containers are coated.

45. Apparatus for lining the interior walls of containers comprising conveyor means providing a plurality of container supports, said conveyor means being operable to move containers mounted on said supports successively through a plurality of treatment stations, nozzle means mounted at a first treatment station to be movable into each container as it passes through such station, metering means coupled to said nozzle means for admitting an explosive mixture to said nozzle means and thence into each container being treated, ignition means for igniting and exploding the mixture within each container, spray nozzle means mounted at a second treatment station to coat the oxidized interior surface of each of the containers as it passes through said second station, and drive means at said second station engageable with said supports to rotate same and the containers carried thereby to promote complete coating of the interior walls of the container.

References Cited in the file of this patent
UNITED STATES PATENTS

| | | |
|---|---|---|
| 932,609 | Hodgson | Aug. 31, 1909 |
| 2,127,723 | Fausek | Aug. 23, 1938 |
| 2,547,884 | Paasche | Apr. 3, 1951 |
| 2,599,644 | Keukens | June 10, 1952 |
| 2,619,430 | Fink | Nov. 25, 1952 |
| 2,627,308 | Clark | Feb. 3, 1953 |
| 2,668,134 | Horton | Feb. 2, 1954 |
| 2,668,592 | Piros | Feb. 9, 1954 |

UNITED STATES PATENT OFFICE
CERTIFICATE OF CORRECTION

Patent No. 2,892,733 June 30, 1959

Edward B. Gardner et al.

It is hereby certified that error appears in the printed specification of the above numbered patent requiring correction and that the said Letters Patent should read as corrected below.

Column 2, line 7, for "of the" read -- in the --; line 56, for "surfaces" read -- surface --; column 3, line 17, for "container" read -- containers --; column 11, line 17, for "surfaces" read -- surface --; column 15, line 65, for "and thereafter" read -- , said timer means being connected to --; line 67, after "gap" strike out ", said timer means being connected to" and insert instead -- after closing of said valve means to --.

Signed and sealed this 23rd day of February 1960.

(SEAL)
Attest:

KARL H. AXLINE
Attesting Officer

ROBERT C. WATSON
Commissioner of Patents